June 23, 1931.  R. N. BOYD  1,811,712
METHOD OF MANUFACTURING AMMONIUM NITRATE
Filed Dec. 14, 1927
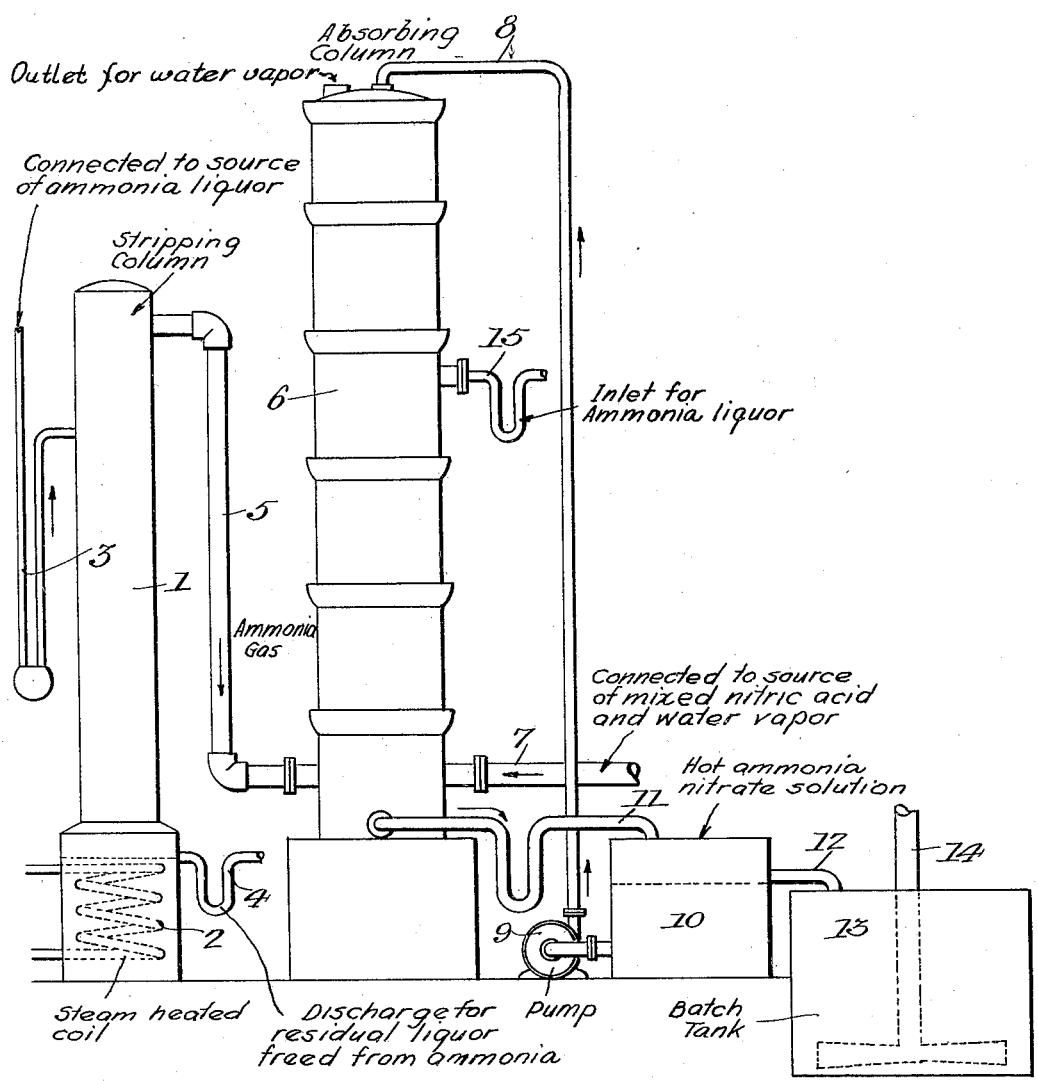
Inventor:
Richard N. Boyd,
by his Attorneys,
Howson & Howson Patented June 23, 1931

1,811,712

UNITED STATES PATENT OFFICE

RICHARD N. BOYD, OF ALLENTOWN, PENNSYLVANIA, ASSIGNOR TO TROJAN POWDER COMPANY, OF NEW YORK, N. Y., A CORPORATION OF NEW YORK

METHOD OF MANUFACTURING AMMONIUM NITRATE

Application filed December 14, 1927. Serial No. 240,012.

The principal object of this invention is to provide novel means for utilizing weak mixtures of nitric acid vapor and water vapor containing up to say 15% of nitric acid by weight in the manufacture of ammonium nitrate.

Weak acid vapors of the above type are sometimes met with in processes for recovering nitric acid from waste or spent acid mixtures of nitric acid and sulfuric acid. These vapors may be so dilute as to render their recovery as weak nitric acid by condensation or as weak ammonium nitrate solution uneconomical, and it is an object of the present invention, therefore, to provide economical means for the recovery of these weak acids.

I have discovered that economical recovery of the aforesaid weak nitric acid in the form of ammonium nitrate may be accomplished by neutralizing the weak mixtures of nitric acid vapor and water vapor with ammonia, either as a liquor or as ammonia gas, in the presence of a hot strong solution of ammonium nitrate. In this process, the sensible heat in the hot weak nitric acid vapors and the heat liberated by the reaction of ammonia and nitric acid are sufficient to prevent the water vapor, entering with nitric acid, from condensing, and also where the ammonia is introduced as aqua ammonia, to evaporate some of the water thus brought into the system so that practically all the water vapor entering the system with the nitric acid vapor is kept in the vapor phase and is exited as such. Where the ammonia is added as a gas, the heat of reaction will serve to concentrate the ammonium nitrate solution circulating through the system.

The operation of the process will be readily understood from the following description and with reference to the attached drawing, which illustrates more or less diagrammatically apparatus made in accordance with the requirements of the present invention. In the drawing, 1 designates a stripping column of standard design including a heating coil 2 which may be supplied with live steam from a suitable source. Ammonia liquor is introduced into the stripping column through an inlet pipe 3 and the residual liquor after it has been freed from ammonia is withdrawn from the outlet 4. The top of the stripping column is connected by a pipe 5 with an absorbing column 6, and through this pipe gas from the top of the stripping column is conducted to the bottom of the absorbing column. Also connected to the bottom of the latter column is a pipe 7 through which is admitted to the column the mixture of nitric acid and water vapor, low in nitric acid. Hot ammonium nitrate solution of say 40% to 60% strength is conducted to the top of the tower 6 through a pipe 8, this pipe extending in the present instance to a pump 9 connected to the bottom of a tank 10, which tank is also connected through a pipe 11 with the bottom of the absorbing tower 6. The tank 10 is provided with an overflow 12 which conducts the "make" of ammonium nitrate solution from the system to a batch tank 13 where the solution which has been kept slightly acid during circulation in the absorber is neutralized with ammonia liquor prior to concentration and the graining or crystallizing of the solution. The tank 13 is provided in the present instance with agitating apparatus 14.

The invention may be practiced without the stripping tower by adding ammonia to the absorber 6 as ammonia liquor. In this event, the said liquor may be introduced into the absorber through a pipe 15 entering the absorber somewhat below the top thereof as illustrated. Preferably the entire equipment should be carefully insulated to conserve heat.

By the foregoing process it has been found possible to produce a concentrated solution of ammonium nitrate from very dilute mixtures of nitric acid vapor and water vapor and in the absence of any considerable quantities of air or other inert gases without application of heat other than that already present in the entering vapors and the heat of reaction of the ammonia with the nitric acid. It is not the intention, however, to limit the process to the use of vapors without admixture with air or other inert gases, since the process will function when the mixed vapors contain considerable quantities of mixed gases. The vapors and gases, however, must enter the absorber at temperatures near or above the boiling point of the mixture of the nitric acid and water vapor.

As a specific example of the operation of this apparatus for the recovery as ammonium nitrate of a mixture of nitric acid vapor and water vapor in which the nitric acid is of low concentration, I may introduce continuously the hot 15% $HNO_3$–85% water vapor mixture from which it is desired to recover the nitric acid, into the bottom of the absorbing column 6. The required ammonia for neutralizing the nitric acid as this nitric acid is supplied, is furnished continuously from the stripping column 1, the stripping column being fed with ammonia liquor of any convenient $NH_3$ content, as for example 25%, and the purpose of this stripping column being to separate the ammonia as $NH_3$ gas containing a very small amount of water vapor from the ammonia liquor, leaving the water in which the ammonia was dissolved to form ammonia liquor to exit as a liquid from the trapped outlet 4. The required heat for this stripping is supplied in the form of steam to the coil 2 with which the stripping column is equipped. Stripping columns are standard equipment and the details of their operation need not be described here.

The ammonia gas delivered from the stripping column is introduced into the bottom of the absorbing column 6 by means of the pipe 5. It is in the absorbing tower, which is a tall hollow column filled with a porous packing which permits comparatively free passage of gases and liquids, that the ammonia gas reacts with the nitric acid in the presence of a hot ammonium nitrate solution. The ammonia gas has already been explained as being introduced into the absorbing column by means of pipe 5 and the mixed nitric acid and water vapors from which the nitric acid is to be recovered in the form of ammonium nitrate are introduced into the bottom of the absorbing column through the pipe 7. The ammonia, nitric acid vapor and water vapor mix and pass upward through the tower down through which is passed a boiling hot 60% solution of ammonium nitrate which serves to collect and carry away the ammonium nitrate formed by the interreaction of the ammonia and nitric acid vapor. The water vapor with which the nitric acid vapor was present when introduced into the system passes on up through the column and exits to the air through the top of the column as a vapor. The boiling 60% solution of ammonium nitrate after passing down the absorbing column and collecting the ammonium nitrate formed by the reaction of the nitric acid vapor and the $NH_3$ vapor flows from the tower through pipe 11 to the storage tank 10 from which it is withdrawn continuously to pump 9 by means of which it is delivered into the top of the tower through pipe 8 in order to maintain a continuous circulation of hot ammonium nitrate solution down the absorption tower 6. The concentration of the ammonium nitrate solution which is circulated through the absorber increases more or less while passing through the absorber due to its taking on the ammonium nitrate which was formed from the ammonia and the nitric acid vapor and is due possibly to a slight evaporation that may take place as a result of the generation of heat supplied by the reaction of the ammonia with the nitric acid. The strength of the ammonium nitrate solution can be adjusted for this increased concentration by adding water or weak ammonium nitrate solution either in tank 10 or to the stream of ammonium nitrate solution as it is fed into the top of the absorption tower. It is not essential to the process that the strength of the ammonium nitrate solution be kept at a uniform concentration so that wide variations in the strength of the ammonium nitrate solution are possible.

It will be seen that the quantity of ammonium nitrate solution in circulation is gradually increased and the "make" is withdrawn continuously or intermittently from tank 10 to the batch tank 13 where it is finally adjusted for neutrality whereupon it is available for the production of ammonium nitrate crystals by concentration and graining or crystallization.

The novel feature of this invention is that the separation of the nitric acid vapor from the large quantity of water vapor with which it existed as a result of some preceding operation, is accomplished by permitting the ammonia gas and the ammonium nitrate solution to selectively withdraw the nitric acid vapor from the vapor mixture passing up through the tower and permitting the water vapor to continue on as a vapor because there is no abstraction of heat which would be necessary before the vapor is changed to a liquid condition.

It is not intended that the apparatus used to carry out the absorbing step of the process be limited to an absorption tower because any other convenient methods of contacting the hot ammonium nitrate solution with the nitric acid vapor and the ammonia gas can be used. Neither is it the intention of placing a limitation as to the form in which the ammonia is supplied to the absorbing step, because the process is adaptable to the addition of the ammonia to the absorbing system in the form of ammonia liquor. In case the ammonia is added in the form of ammonia liquor its addition should be made in such a way as to allow for ample contact between the nitric acid vapor and the ammonia.

I claim:

The method of concentrating an aqueous solution of ammonium nitrate, which comprises adding to such solution nitric acid occurring in vaporous condition with or without water vapor, and ammonia in vaporous condition, and simultaneously evaporating water from the ammonium nitrate solution, the latent heat of evaporation required to effect such evaporation being supplied solely from the heat evolved in the reaction between the gaseous ammonia and the vaporous nitric acid.

RICHARD N. BOYD.